May 17, 1966   E. C. BRANINE   3,251,456
GRAIN AUGER ATTACHMENT
Filed March 24, 1964   2 Sheets-Sheet 1
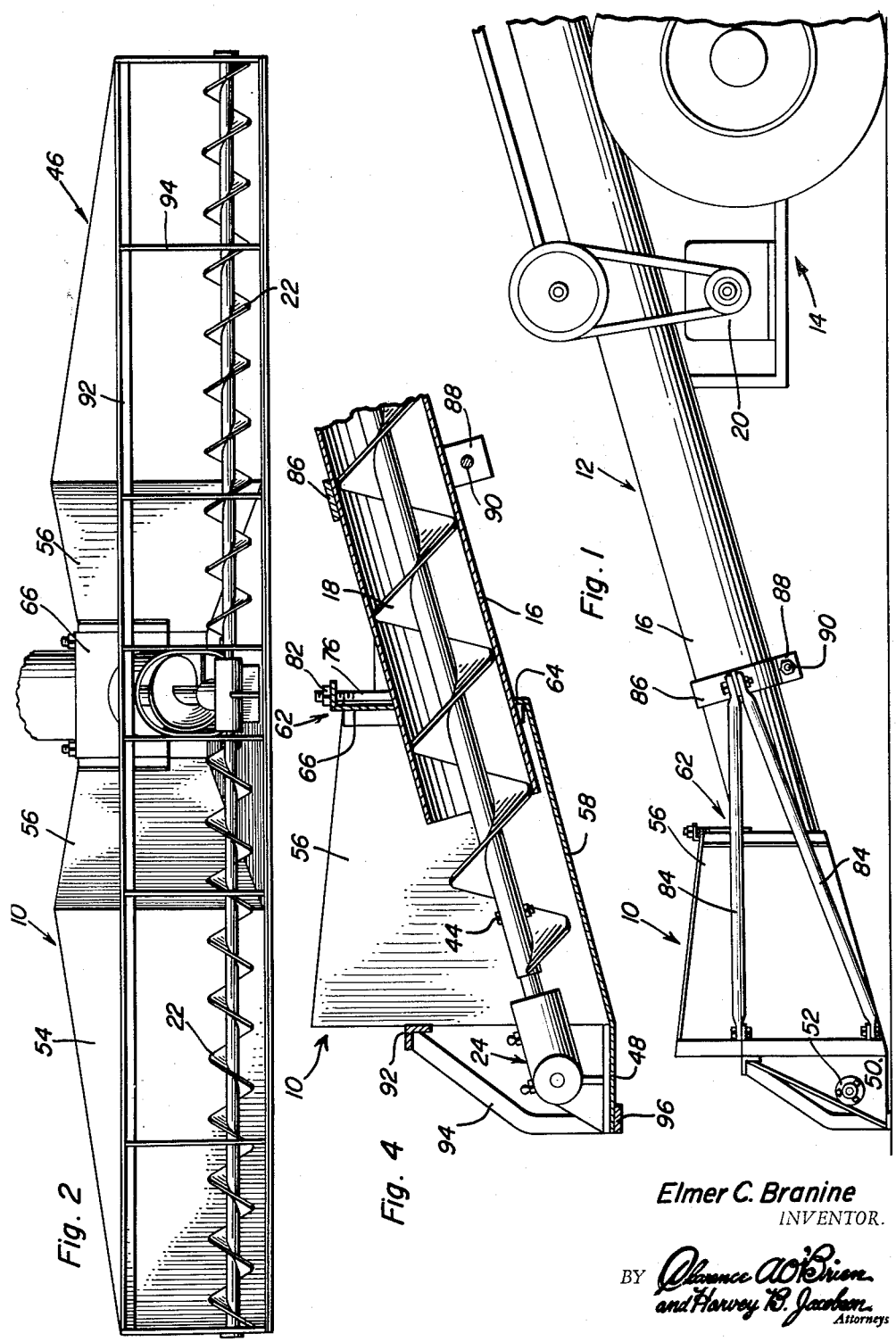
Elmer C. Branine
INVENTOR.
BY Clarence A. O'Brien
and Harvey B. Jacobson
Attorneys May 17, 1966  E. C. BRANINE  3,251,456
GRAIN AUGER ATTACHMENT
Filed March 24, 1964  2 Sheets-Sheet 2
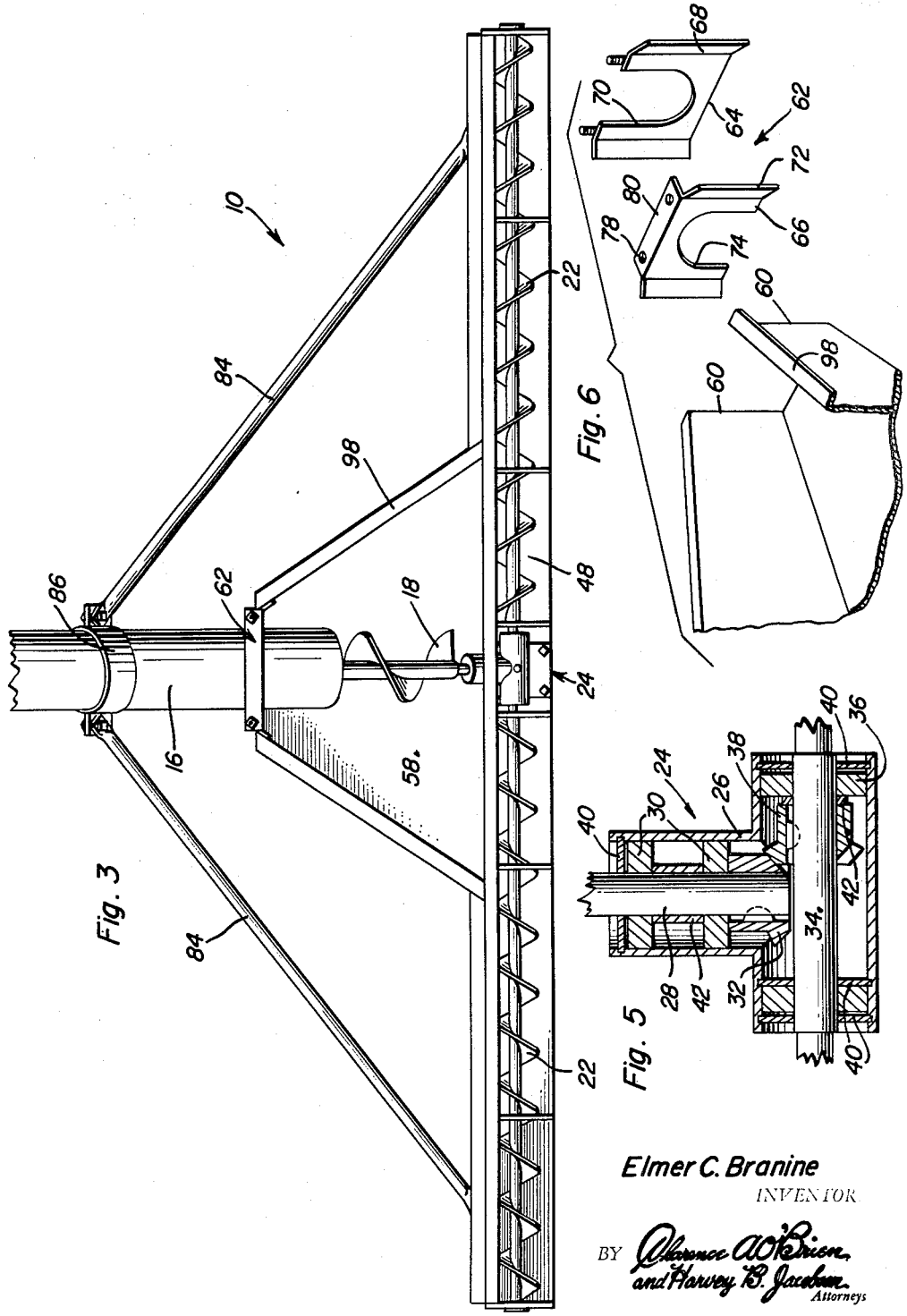
Elmer C. Branine
INVENTOR United States Patent Office 3,251,456
Patented May 17, 1966

3,251,456
GRAIN AUGER ATTACHMENT
Elmer C. Branine, Box 365, Kendall, Kans.
Filed Mar. 24, 1964, Ser. No. 354,258
5 Claims. (Cl. 198—217)

The present invention is generally concerned with portable grain augers or elevators, and is more particularly directed toward an attachment for such augers.

It is a primary object of the instant invention to provide a grain auger attachment which consists of laterally directed conveying means utilized to move any grain encountered thereby to a central location wherein such grain will be readily accessible by the main auger upon which the attachment is mounted.

Another object of the instant invention is to provide a grain guiding attachment which is simultaneously operated with the portable auger, and in fact, is operated from the same power source.

Further, it is a significant object of the invention to provide an attachment for a grain auger which allows the complete removal of all of the grain encountered along a substantially wide given path as the portable auger is moved through the grain.

Also, it is an object of the instant invention to provide a grain auger attachment which is of a relatively simple and rugged nature capable of being quickly and rigidly mounted on the portable auger for movement therewith.

These together with other objects and advantages which will become subsequently apparent reside in the details of construction and operation is more fully hereinafter described and claimed, reference being had to the accompanying drawings forming a part hereof, wherein like numerals refer to like parts throughout, and in which:

FIGURE 1 is a side elevational view of the lower portion of carriage mounted portable auger having the attachment of the instant invention mounted thereon;

FIGURE 2 is a front elevational view of the auger mounted attachment;

FIGURE 3 is a top plan view of the auger mounted attachment;

FIGURE 4 is a transverse cross-sectional view through both the attachment and the lower end of the portable auger upon which it is mounted;

FIGURE 5 is a horizontal cross-sectional view through the gear housing; and

FIGURE 6 is an exploded perspective view illustrating the rear end of the scoop chamber and the clamping gate mounted thereon.

Referring now more specifically to the drawings, reference numeral 10 is used to generally designate the attachment comprising the instant invention. This attachment 10, while adapted to be mounted on a variety of different types of portable augers or grain elevators, has, for the purpose of illustration, been shown mounted upon a portable carriage mounted auger 12, the carriage being generally designated by reference numeral 14. The auger 12 consists basically of a conveying tube 16 and the conveying auger 18 itself, this auger being driven in any suitable manner such as by the carriage mounted motor 20. As will be appreciated from the drawings, the lower end of the conveying or raising auger 18 projects outwardly or forwardly of the conveying tube 16, this lower end normally being introduced into the grain.

The attachment 10 includes two aligned inwardly directed horizontal feeder augers 22. These augers 22 are driven directly from the lower end of the raising auger 18 through a power transferring unit 24. This unit 24 consists basically of a hollow T-shaped housing 26, a first shaft 28 rotatably mounted within spaced bearings 30 and having a bevel gear 32 keyed on the inner end thereof, and a second shaft 34 rotatably supported by bearings 36 and including a bevel gear 38 keyed thereon and meshed with the gear 32. Suitable snap rings 40 and spacers 42 will also be used as needed so as to retain the various elements. As will be appreciated from the drawings, the shaft 28 projects from the housing 26 and is releasably fixed to the lower end of the shaft of the auger 18 by, for example, bolt means 44, the shaft 28 having been telescoped within the lower end of the shaft of the auger 18. The opposite ends of the shaft 34 project outwardly in opposite directions from the housing 26 and are similarly secured to the inner ends of the feed augers 22. In this manner, as the auger 18 is rotated from, for example, the motor 20, its rotational movement is transferred, through the gear box, to the oppositely directed feed augers 22 causing a simultaneous rotation of these feed augers 22.

In conjunction with the feed augers 22, the attachment 10 includes a scoop 46. The scoop 46 includes an elongated bottom panel 48 slightly wider than the augers 22 and positioned immediately therebeneath, this bottom panel 48 being of a length substantially equal to the combined length of the augers 22 and the gear box 24. A vertical panel 50 is provided at each end of the bottom panel 48, these end panels 50 each rotatably supports the outer end of one of the augers 22 through suitable bearing means 52. The gear housing 26 is also secured to the bottom panel 48 at the center thereof.

A pair of vertical back panels 54, one extending inwardly from each of the opposite ends of the bottom panel 48 are provided, these back panels 54 being located immediately behind and parallel to the augers 22. At points spaced outwardly from the inner ends of the augers 22, the back panels 54 are rearwardly angled so as to form rearwardly converging portions 56. These converging back panel portions 56 form, in conjunction with a rearwardly enlarged and upwardly inclined central portion 58 of the bottom panel 48, an enlarged open top and open front chamber surrounding the lower end of the auger 12 which is introduced into the chamber between the spaced rear edges 60 of the converging back panel portions 56.

The attachment 10 is mounted on the conveyor 12, in addition to the securing of the shaft of the auger 18 to the gear box shaft 28, by an adjustable clamp structure 62 mounted on the rearward edge portions of the portions 56. This clamp structure 62 consists of a fixed plate 64 and a movable plate 66. The fixed plate 64 extends upwardly from the rear edge of the bottom panel 58 and includes two forwardly angled side flanges 68 fixed along the outer rear surfaces of the portions 56, this fixed plate 64 including a relatively deep upwardly opening notch 70 in its upper edge, this notch 70 receiving the auger tube 16 therein. The movable plate 66 is positioned against the forward face of the fixed plate 64 and includes two forwardly angled side flanges 72 which slidably engage the inner surfaces of the portions 56, this plate 66 including an upwardly opening enlarged notch 74 in its lower edge thereof generally conforming in shape and size to the notch 70 so as to engage over the conveyor tube 16. The movable plate 66 is drawn tightly down into engagement with the upper portion of the conveyor tube 16 through a pair of adjusting rods 76 which are fixed to the fixed plate 64 on opposite sides of the notch 70 and project vertically thereabove through a pair of apertures 78 in a rearwardly extending top flange 80 on the plate 66, the upper ends of the rods 76 being externally threaded and receiving nuts 82 threaded thereon so as to effect a downward or clamping movement of the plate 66.

In order to further rigidify the attachment 10 relative to the auger 12, four rearwardly converging elongated braces 84 are provided, one from adjacent the upper and lower outer edges of each of the vertical back panels 54. The rear ends of these braces 84 are secured to an adjustable collar 86 which encircles the conveyor tube 16 rearward of the clamping structure 62, this clamping collar 86 being, for example, in the form of a split ring having flanged free ends 88 which are drawn into clamping engagement by a threaded bolt and nut combination 90.

The scoop 46 is rigidified by a longitudinally extending angle member 92 welded, or otherwise suitably secured, to the front faces of the aligned portions of the back panels 54, this rigidifying angle member 92 extending completely across the front of the scoop 46 at a point substantially above the augers 22. In addition, vertical braces 94 are provided at spaced points along the front of the scoop 46, these braces 94 having the lower ends thereof rigid with the bottom panel 48 and the upper ends thereof rigidly affixed to the angle brace 92. These brace members 94, as will be appreciated from the drawings, include a lower vertical portion and a rearwardly angled upper portion so as to in effect enclose the augers 22.

In order to both rigidify the forward edge of the bottom panel 48 and provide a wear plate, an elongated flat member 96 is secured to the lower surface thereof along the forward edge.

The upper edges of the back panels 54, as will be appreciated from FIGURE 2, are upwardly inclined from the outer edges thereof thereby providing a greater height as the central chamber is approached so as to accommodate the greater amount of grain as the grain is moved inwardly by the augers 22. In addition, these upper edges of the back panels 54 are also provided with laterally directed flanges 98, also for the purpose of rigidification.

From the foregoing detailed description, it will be appreciated that a highly novel auger attachment has been defined, this auger attachment, upon being mounted upon a portable upwardly inclined auger, providing for a substantial increase in the effectiveness of the auger by providing for a continuous introduction of all of the grain for a substantial distance to both sides of the raising auger. In actual operation, the auger mounted attachment is moved slowly along the ground into a pile of grain with all of the grain, along a path of travel equal to the width of the attachment, entering the attachment and being moved inwardly from both side edges thereof and towards the enlarged central chamber wherein the exposed end of the raising auger is located. The outer portions of the back panels located parallel to and just to the rear of the feed augers function so as to retain the grain directly in the vicinity of the feed conveyor so as to ensure a moving of all of the grain inwardly toward the raising conveyor, the back panels also acting so as to guide the grain. In this manner, a clean sweep is achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a grain loading device consisting of an elongated conveying tube and a driven conveyor means mounted within the tube and projecting beyond an end thereof, said attachment comprising a pair of aligned inwardly directed horizontally extending augers, means mounting and interconnecting the inner ends of said augers for simultaneous rotation, a scoop means, said scoop means including a horizontal bottom panel located beneath said pair of augers, means at the opposite ends of said bottom panel rotatably supporting the outer ends of said pair of augers, a pair of vertical back panels, one back panel extending inwardly from the outer end of each auger parallel to the auger and slightly to the rear thereof, each back panel, at an intermediate point along the corresponding auger, being rearwardly angled so as to form a portion in rearwardly converging relation to the similar portion on the other back panel, thereby forming an enlarged chamber rearward of the interconnected inner ends of the augers, said bottom panel being rearwardly enlarged along the central portion thereof with this centrally enlarged bottom panel portion closing the bottom of the chamber, said converging back panel portions having the free rear edges thereof located in spaced parallel relation to each other, and an adjustable clamping means fixed to said rear edges and selectively restricting the space therebetween, said clamping means including a fixed plate extending between the rear edges for a portion of the vertical height thereof, and a movable plate extending between the rear edges and selectively movable toward and away from the fixed plate for the purpose of clamping a conveying tube therebetween.

2. The structure of claim 1 including a pair of elongated braces, one brace having a first end thereof secured to each back panel adjacent the outer edge thereof, said braces converging rearwardly and having the second ends thereof interconnected by an adjustable clamp means located rearward of the rear edges of the back panels.

3. A grain loading unit including an upwardly inclined raising auger, a conveyor member received about all but the lower end portion of the raising auger, a pair of horizontal feed augers extending in opposite directions from the lower end of the raising auger, means for driving the raising auger, gear means interconnecting the lower end of the raising auger and the two feed augers for effecting a driving of the feed augers from the driven raising auger, a horizontal bottom panel located immediately below the feed augers and extending the full length thereof, a pair of vertical back panels secured to the rear edge of the bottom panel and extending inwardly from the opposite ends thereof parallel to the feed augers, each back panel having the inner portion thereof rearwardly angled so as to form rearwardly converging portions forming an enlarged chamber enclosing the lower end of the raising auger, said converging back panel portions having the free rear edges thereof located in spaced parallel relation to each other, and an adjustable clamping means fixed to said rear edges and selectively restricting the space therebetween, said clamping means including a fixed plate extending between the rear edges for a portion of the vertical height thereof, and a movable plate extending between the rear edges and selectively movable toward and away from the fixed plate for the purpose of clamping the conveyor member therebetween.

4. An attachment for a grain loading device consisting of an elongated conveying unit, said attachment comprising a pair of aligned inwardly directed generally horizontally extending conveyors, means mounting said conveyors for conveying movement inwardly toward each other, a scoop means, said scoop means including a substantially horizontal bottom panel located beneath said pair of conveyors, a pair of vertical panels, one back panel extending inwardly from the outer end of each conveyor parallel thereto and slightly to the rear thereof, each back panel, at an intermediate point along the corresponding conveyor, being rearwardly angled so as to form a portion in rearwardly converging relation to the similar portion on the other back panel, thereby forming an enlarged chamber rearward of the inner ends of the conveyors, said bottom panel being rearwardly enlarged along the central portion thereof so as to define a bottom for said chamber, said converging back panel portions having the free rear edges thereof located in spaced parallel relation to each other, and an adjustable clamping means fixed to said rear edges and selectively restricting the space therebetween, said clamping means including a fixed plate extending between the rear edges for a portion of the vertical height thereof, and a movable plate extending between the rear edges and selectively movable toward and away from the fixed plate for the purpose of clamping a conveying unit therebetween.

5. An attachment for a grain loading device consisting of an elongated conveying unit; said attachment comprising at least one elongated horizontally extending auger, scoop means received about and mounting said auger, said scoop means including a substantially horizontal bottom panel located beneath said auger, a vertical back panel extending along a major portion of said auger in parallel relation thereto and to the rear thereof, and a pair of rearwardly converging panel portions at the discharge end of said auger, one of said panel portions constituting a continuation of said back panel, said bottom panel being rearwardly enlarged between said converging walls and defining, in conjunction with said converging walls, a rearwardly enlarged chamber for reception of a conveying unit at an angle to said auger, said converging panel portions terminating in spaced parallel rear edges, and an adjustable clamping means fixed to said rear edges and selectively restricting the space therebetween, said clamping means including a fixed plate extending between the rear edges for a portion of the vertical height thereof, and a movable plate extending between the rear edges and selectively movable toward and away from the fixed plate for the purpose of clamping a conveying unit therebetween.

References Cited by the Examiner
UNITED STATES PATENTS

| 2,623,624 | 12/1952 | Slocum | 198—9 |
| 3,140,768 | 7/1964 | Marr | 198—217 X |

FOREIGN PATENTS

| 126,683 | 4/1959 | Russia. |

SAMUEL F. COLEMAN, *Primary Examiner.*

EDWARD A. SROKA, *Examiner.*